United States Patent [19]

Nagai

[11] Patent Number: 4,457,639
[45] Date of Patent: Jul. 3, 1984

[54] MOTOR CONTROL FOR PRINTER CARRIAGE

[75] Inventor: Akio Nagai, Shiojiri, Japan

[73] Assignee: Epson Corporation, Nagono, Japan

[21] Appl. No.: 430,424

[22] Filed: Sep. 30, 1982

[30] Foreign Application Priority Data

Oct. 7, 1981 [JP] Japan .............................. 56-159898

[51] Int. Cl.³ .......................... B41J 19/30; G05B 1/02
[52] U.S. Cl. .................................... 400/322; 318/607
[58] Field of Search ............. 400/322, 323, 120, 321, 400/320; 318/599, 606, 607, 135, 603

[56] References Cited

U.S. PATENT DOCUMENTS

| | | | |
|---|---|---|---|
| 3,548,282 | 12/1970 | Schiller | 318/606 |
| 3,836,756 | 9/1974 | Yammoto et al. | 318/606 X |
| 3,906,327 | 9/1975 | O'Callaghan | 318/606 |
| 3,963,971 | 6/1976 | Leenhouts et al. | 318/603 X |
| 3,986,091 | 10/1976 | Quiogue et al. | 400/322 |
| 4,147,967 | 4/1979 | Alena | 400/322 X |
| 4,180,766 | 12/1979 | Matula | 400/322 X |
| 4,194,144 | 3/1980 | Reynolds | 318/603 X |
| 4,203,679 | 5/1980 | Duerr et al. | 400/322 X |
| 4,359,289 | 11/1982 | Barrus et al. | 400/322 |
| 4,376,914 | 3/1983 | Kimura | 318/607 |

OTHER PUBLICATIONS

"Motor Speed Control from Frequency Reference", IBM Technical Disclosure Bulletin, vol. 23, No. 3, Aug. 1980, pp. 1231–1233.
"Motor Speed Control for a Typewriter", IBM Technical Disclosure Bulletin, vol. 23, No. 9, 2/81, pp. 4202–4204.
"Reduction of Digital Tachometer Ripple by Bandwidth Switching in Servo Control Systems", IBM Tech. Discl. Bul., vol. 21, No. 11, 4/79, pp. 4309–4310.

Primary Examiner—E. H. Eickholt
Attorney, Agent, or Firm—Blum, Kaplan, Friedman, Silberman & Beran

[57] ABSTRACT

A motor control for a printer carriage using a DC motor includes a phase-locked loop speed control circuit having an encoder detecting motor speed, a reference oscillator, a phase comparator for detecting the phase difference between the encoder signal and oscillator output signal, and a switching circuit for voltage to be applied to the motor based upon the phase comparator output. Additionally, the motor control includes a feedback circuit having a low pass filter converting the phase comparator output signal into an analog speed signal, and a differentiating circuit converting the filter output signal into a quasi-acceleration signal. The feedback circuit effects frequency modulation of the reference oscillator using the output signal from the differentiating circuit. A speed setting switch means adjusts the selected rotational speed of the motor by changing the oscillator frequency. A mode selection circuit controls signals from the phase comparator to apply braking by reversal of motor current, and to provide reverse motor operation for shifting the carriage.

6 Claims, 7 Drawing Figures

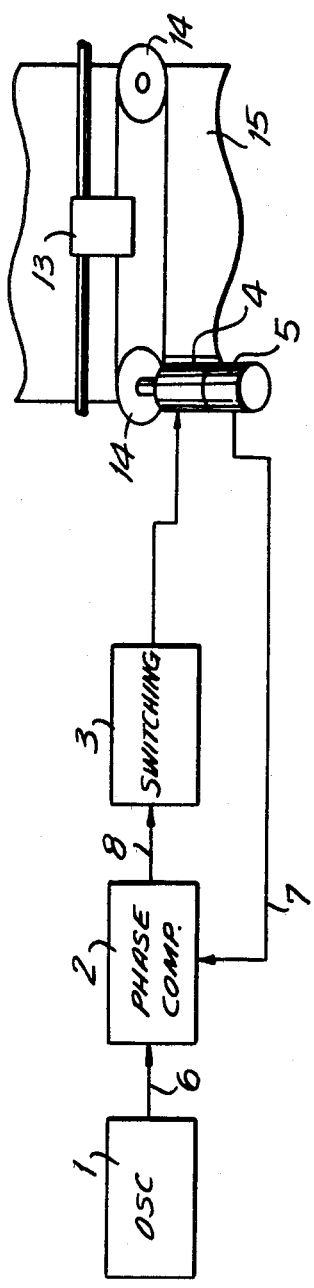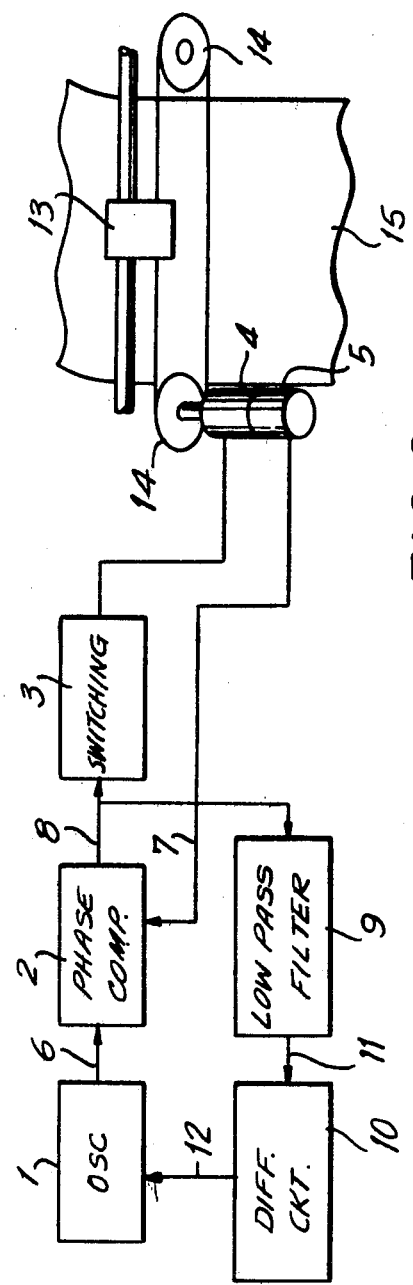

MOTOR CONTROL FOR PRINTER CARRIAGE

BACKGROUND OF THE INVENTION

This invention relates generally to a motor control of the type used to transport the carriage in a small calculator operating on DC power. An analog type apparatus applying a tachometer generator for controlling the motion of a printer carrier using a DC motor has been widely used. With digital type detectors such as rotary encoders, linear encoders or the like becoming readily available in recent years, control systems of the digital type have found applications which utilize such digital type detectors. Because of the resultant improved control precision and simple control circuit arrangements, many digital control apparatuses of the phase-locked loop type have been used which detect a signal from a reference oscillator. The oscillator provides a signal dependent on a speed setting, and a phase-difference signal from an encoder is used for directly switching the voltage applied to the motor for speed control using such digital signals.

Such control systems have been widely used on equipment for civilians as the reference oscillator and phase comparator which provide the phase difference signal, are available commercially as integrated circuits. The control system is advantageous in that it has a relatively high control accuracy as the accuracy in measuring speed is determined by the stability of the reference oscillator. The circuit and the motor generate a reduced amount of heat under such control. However, the control system has a disadvantage in the high gain of the control loop, which cannot be readily changed. The result is that the system is liable to oscillate easily and accordingly, is poor in stability. The problem manifests itself especially where the control system is used in an apparatus for controlling the carriage of a serial printer which requires a high speed response since the frictional and inertial loads are designed to be small as compared with the output of the motor which is used. The difficulty is responsible for an oscillation phenomenon which causes irregular dot intervals and poor printing quality in dot impact printers and ink jet printers of the serial type which print in high dot densities for higher printing quality. The above described difficulties could be eliminated by lowering the gain of the control loop, an arrangement which, however, would require complicated circuitry and result in lowered control accuracy.

What is needed is a motor control for a printer carriage which is simple in construction, low in cost and has high control accuracy and stability with regular dot intervals when printing.

SUMMARY OF THE INVENTION

Generally speaking, in accordance with the invention, a motor control for a printer carriage especially suitable for small printers and providing high performance and high precision at low cost is provided. The motor control for a printer carriage using a DC motor includes a phase-locked loop speed control circuit having an encoder detecting rotational speed of the DC motor, a reference oscillator outputting reference speed pulse signals, a phase comparator for detecting the difference between the phases of an output signal from the encoder and an output signal from the reference oscillator, and a switching circuit for switching the voltage to be applied to the DC motor based upon the output signal from the phase comparator. Additionally, the motor control for a printer carriage includes a feedback circuit having a low pass filter which converts the output signal from the phase comparator into an analog speed signal, and a differentiating circuit converting the output signal from the low pass filter into a quasi-acceleration signal. The feedback circuit effects frequency modulation of the output signal from the reference oscillator using the output signal from the differentiating circuit. A speed setting switch means adjusts the selected rotational speed of the motor by changing the oscillation frequency of the reference oscillator and the signal derived therefrom. A mode selection circuit controls signals from the phase comparator to the motor to apply braking to the motor electrically by reversal of the current therethrough, and to provide for reverse operation of the motor for shifting the carriage.

Accordingly, it is an object of this invention to provide an improved motor control for a printer carriage for a DC motor which is small, reliable and precise.

Another object of this invention is to provide an improved motor control for a printer carriage which provides rapid changes in speed and direction with little overshoot of the printer carriage.

Still other objects and advantages of the invention will in part be apparent and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a functional block diagram of a conventional phase-locked loop control apparatus for a printer carriage;

FIG. 2 is a functional block diagram of a motor control for a printer carriage having an acceleration feedback loop added to a phase-locked loop controlling circuit;

FIGS. 13a, b illustrate speed versus time characteristics of the circuits of FIGS. 1 and 2, respectively;

DESCRIPTION OF THE PREFERRED EMBODIMENTS

Figure 3A:
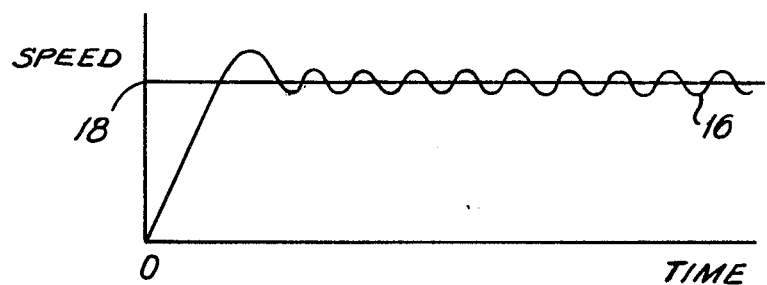

Analog type apparatus employing a tachometer generator for controlling the motion of a carriage using a DC motor has been widely used. With digital type detectors such as rotory encoders, linear encoders or the like becoming readily available in recent years, control systems of the digital type utilizing such detectors have found usage. Because of the improved control precision and simpler control circuits, many digital control apparatuses of the phase-locked loop type have been used which detect a signal from a reference oscillator dependent on a speed setting and a phase difference signal from an encoder for directly switching the voltage applied to the motor for speed control.

FIG. 1 is a basic block diagram of a conventional motor control for a printer carriage of the type described above, and includes a phase comparator 2 for detecting the difference between the phase of reference speed pulses 6 generated by a reference oscillator 1 and a train of speed-dependent pulses from an encoder 5 coupled to a DC motor 4. The DC motor 4 is driven for speed control by a switching circuit 3 supplied with a pulse signal 8. The duty cycle of the pulse signal 8 varies with the detected phase difference so as to alter the speed of the motor. The output of the motor 4 is connected to a pulley 14 which, by means of a closed wire loop connected to a carriage 13, provides motion for the carriage 13 transversely to a print paper 15. The direction of motion of the carriage 13 is controlled by the direction of rotation of the DC motor 4.

Such a control system has been widely used on equipment for civilian purposes because the reference oscillator 1 and phase comparator 2 are commercially available as integrated circuits, and the switching circuit 3 can be constructed easily of transistors. The control system is advantageous in that it has quite high control accuracy and the accuracy of motor speed is determined by the stability of the reference oscillator 1. The circuit and the motor generate less heat as compared to earlier control systems. However, the control system has a disadvantage of a high gain in the control loop which cannot be readily changed. As a result, the system is liable to oscillate easily and hence, is poor in stability. The problem manifests itself especially where the control system is used in an apparatus for controlling the carriage of a serial printer which requires a high speed response since the frictional and inertial loads are designed so as to be smaller when compared with the output of the motor. This difficulty is responsible for an oscillation phenomenon which causes irregular dot intervals and poor printing quality in dot impact printers and in ink jet printers of the serial type which print with high dot densities for higher printing quality. Although the above problems can be eliminated by lowering the gain of the control loop, such an arrangement to be effective would require complicated circuitry and result in lowered control accuracy.

In an earlier development, the inventor has filed a Japanese patent application No. 56-9974 which discloses a system for improving the stability of and suppressing oscillation of the carriage controlling apparatus by adding a simple circuit, and without lowering the loop gain. FIG. 2 is a block diagram of such a system wherein a phase difference signal 8, detected by a phase comparator 2, is converted by a low pass filter 9 into an analog speed signal 11. The analog speed signal 11 is then passed through a differentiating circuit 10 and converted into a quasi-acceleration signal 12. The signal 12 serves to frequency modulate, that is, change the frequency of the output signal from the reference oscillator 1. The control system is functionally equivalent to a speed control apparatus composed of an analog circuit including an acceleration feedback loop. This has the advantage that it improves stability without lowering the rapid responsiveness and high accuracy which a phase-locked loop control apparatus has.

Figure 3B:
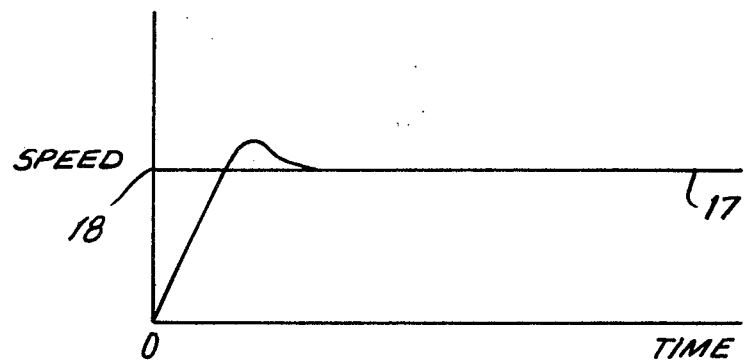

FIG. 3a shows a response curve 16 for a phase-lock loop control apparatus as shown in FIG. 1. FIG. 3b shows a speed response curve 17 for a control apparatus of the type illustrated in FIG. 2. In FIGS. 3a, b, the selected speed setting is indicated by a reference numeral 18, and the curves illustrate transitions from a standstill or stopped condition at the time 0 when a signal indicative of the desired speed setting 18 is applied. The Figures illustrate that the motor control for a printer carriage of FIG. 1 hunts continuously around the selected speed 18 whereas the construction of FIG. 2 initially overshoots the selected speed 18 but settles down quickly to the selected value without hunting.

In controlling the carriage of a serial printer, the carriage can skip an interval in which no printing is needed at a high speed, and can move at a high speed to a next start-printing position after a previous line has been printed. Thereby, printing speed is increased substantially.

Figures 4, 5:
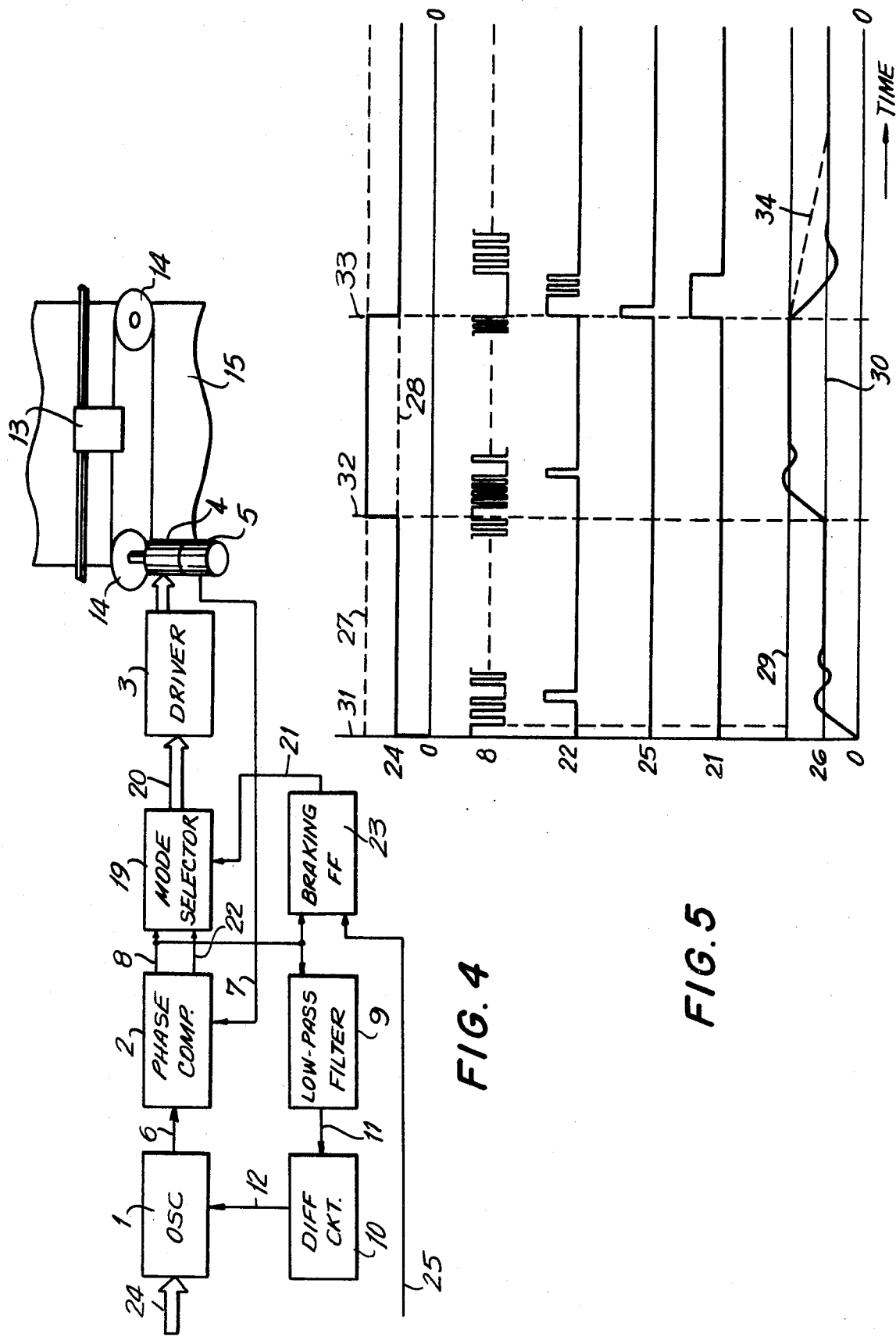
FIG. 4 is a functional block diagram of a motor control for a printer carriage in accordance with the invention.
FIG. 5 shows electrical signals in the diagram of FIG. 4 and illustrates a speed response curve.

With the foregoing in view, a motor control for a printer carriage in accordance with the invention provides a construction for improving responsiveness at the time of reducing the speed setting using a simple circuit without adding any special mechanical braking device. An embodiment of a motor control for a printer carriage in accordance with the invention is illustrated in FIG. 4 wherein the construction of FIG. 2 is modified by the addition of a mode selection circuit 19 and other functions as described more fully hereinafter. Similar reference numerals are used in all of the Figures to indicate similar functions.

To change selected speed settings, the reference oscillator 1 is supplied with an input signal 24 which changes the output frequency of the reference oscillator 1. The output frequency signal 6 from the oscillator 1 varies in accordance with the particular speed setting signal 24 which is applied to the oscillator 1. When a speed setting, fed as an input 24, is larger that the speed setting prior to the change, the speed response of the motor 4 is not instantaneous and a phase-advanced signal 8 is produced from the phase detector. That is, the phase detector 2 provides a particular output signal when the oscillator output signal is leading with respect to the encoder output signal 7. The phase-advanced signal 8 is supplied through a mode selection circuit 19 and a driver circuit 3 to the motor 4 for increasing the speed of rotation of the motor. The controlling process, as the motor reaches and exceeds the selected speed is the same as that in the construction shown in FIG. 2 and FIG. 3b in suppressing any hunting of the carriage.

Conversely, when the speed setting signal 24, supplied as an input, selects a lesser speed than the preceding speed setting, a speed reduction signal 25 is applied to a braking flip-flop 23 simultaneously with the change of the speed setting signal 24. Thus, the flip-flop 23 is set. The flip-flop 23 produces an output signal 21 causing the mode selection circuit 19 to switch from responding to the phase-advanced control signal 8 to receiving the phase-delayed signal 22. The phase-delayed signal 22 is produced whenever the phase of the oscillator output signal is lagging with respect to the encoder output signal 7. This occurs because the motor speed does not instantaneously change when the speed setting signal 24 is lowered. Application of the phase-delayed signal 22 to the mode selection circuit 19 changes the polarity of supply voltage applied to the motor 4 and acts as a signal fed to the driver circuit 3 for braking. The motor slows down and the phase-advanced signal 8 is again generated when the motor speed becomes lower than the speed setting. The recurrence of the signal 8 resets the flip-flop 23 which effects switching in the mode selection circuit 19 for allowing the control mode signal 8 to again be operative as it was prior to braking. The control circuit performs the braking action by applying an opposite direction currrent flow for deceleration, so that substantially the same rapid response is available during acceleration and during deceleration.

FIG. 5 illustrates waveforms and signals when speed settings are changed. When the speed setting 24 varies from a level 0 to a level 28 at the time indicated by the reference numeral 31, the speed of the motor controlled by the control circuit increases from a level 0 to a level 30 as shown by the speed curve 26. After motor speed has stabilized and the speed setting 24 is further increased to a level 27 at the time 32, the speed 26 goes up to a higher level 29 where it becomes stabilized. At a time 33, the speed 26 is then reduced again to a level 30 when the speed setting 24 is decreased to the level 28. A broken line 34 indicates a linear speed characteristic which is available when the additional circuit of mode selection 19 and flip-flop 23 are not included. As illustrated, in the embodiment of FIG. 4, speed stability is achieved much more rapidly.

Figure 6:
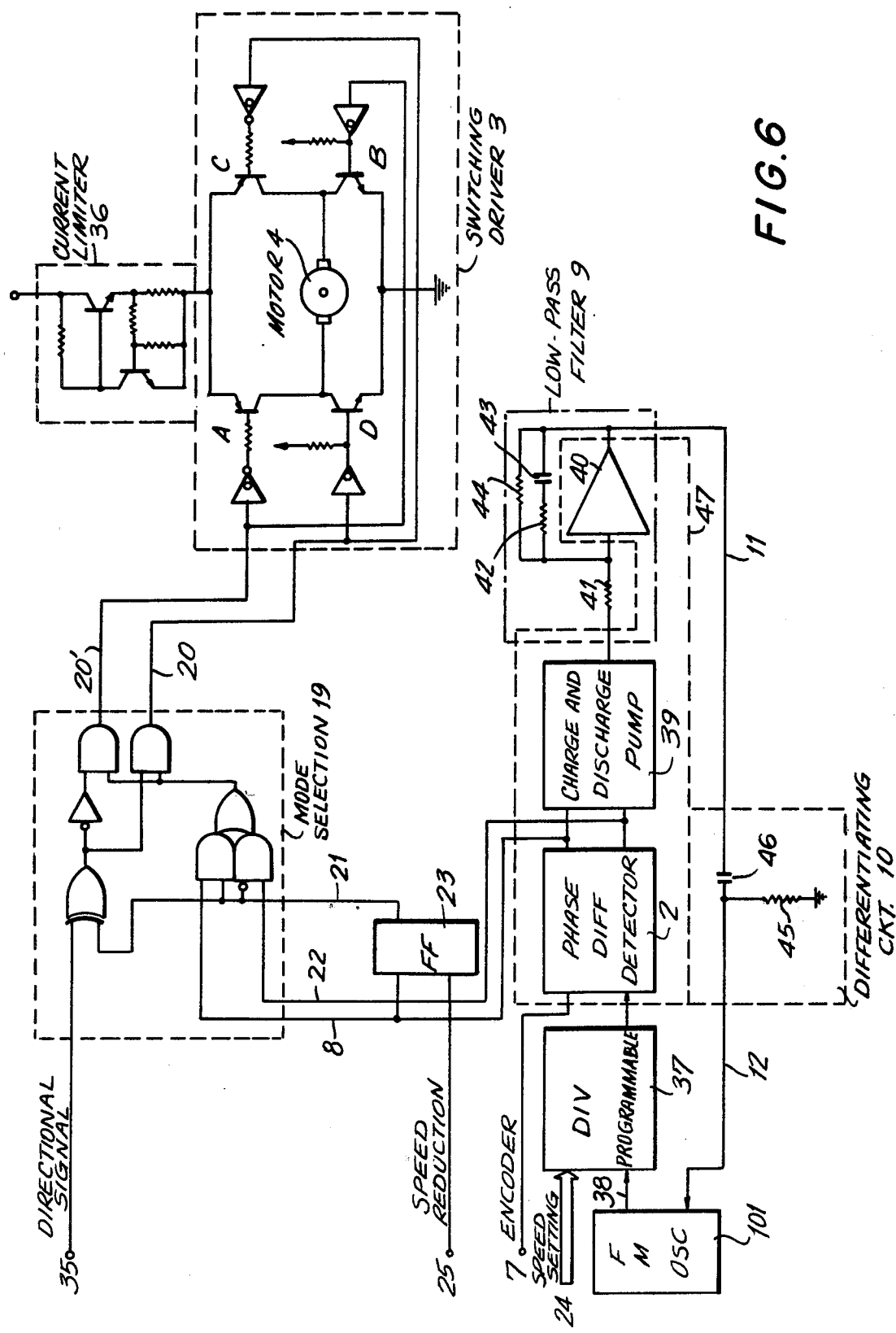
FIG. 6 is a circuit drawing of the motor control for the printer carriage in accordance with the invention as shown in FIG. 4.

FIG. 6 is a detailed circuit diagram of the motor control for a printer carriage as shown in FIG. 4. The circuit includes an integrated circuit 101 for producing an output frequency signal 38 which is then frequency divided by a programmable frequency divider 37 into a frequency which is dependent on the speed setting signal 24. That is, the division ratio of the divider 37 is programmable dependent upon the speed setting signal 24. The frequency signal generating circuit 101 is also frequency modulated by means of an acceleration signal 12 such that the signal entering the divider 37 is variable in response to the speed of the motor 4 as discussed above and in more detail hereinafter. The phase difference detector 2 detects the difference in phase between an output signal from the programmable frequency divider 37 and an encoder signal 7 sensing motor speed (FIG. 4). A charge and discharge pump circuit 39 cooperates with a low pass filter 9 including an operational amplifier 40, so as to convert the phase-difference signal into an analog speed signal 11. The analog speed signal 11 is then converted to the acceleration signal 12 by passing through a differentiating circuit 10. The portion of the circuit of FIG. 6 enclosed by the broken line 47 is contained in an integrated circuit which is commercially available for phase-locked loop control and is not novel per se.

A signal 35 serves to determine the direction of movement of the carriage 13 cooperating with the motor 4 as shown in FIG. 4. The mode selection circuit 19 is responsive to both the signal 35 and an output signal 21 from the braking flip-flop 23 for effecting switching between a phase-advanced signal 8 and a phase-delayed signal 22.

The mode selection circuit 19 produces outputs 20 or 20′ which enable the switching driver 3, comprising four transistors A-D so as to change the polarity and time of application of the supply voltage for the motor 4. Depending upon the level of the signals 20, 20′, which are always of opposite states, current to the motor 4 flows through the transistors A and B for energization of the motor for rotation in one direction or through the transistors C and D to energize the motor to operate in the other direction. As previously stated and illustrated at 26 in FIG. 5, an instantaneous change in the direction of current flow through the motor 4 does no instantaneously change the direction of rotation of the motor 4 but acts as a brake on that rotation. A current limiter circuit 36 serves to limit the large current which is generated when the motor is energized for an opposite rotation when already in motion, or when the motor is started. Thereby, rapid deterioration is prevented of the service life in a system for driving the carriage of the serial printer, wherein the DC motor is required to be started, stopped and reversed at frequent intevals.

The band width of the low pass filter 9 is determined by a resistor 44 and a capacitor 43 so as to be sufficiently lower than the frequency of the encoder signal corresponding to the speed setting and wide enough to pass the natural frequency of the control system which can be determined through actual measurements or calculations. The low pass filter 9 includes a resistor 42 for high frequency compensation, the value of which is selected to be sufficiently less than that of the resistor 44. The ratio of resistance of the resistor 41 to the resistor 44 serves as a parameter for adjusting the damping ratio of the control system.

The differentiating circuit 10 has a time constant determined by the product of the resistance of the resistor 45 and the capacitance of the capacitor 46, the time constant being selected to give a differentiating effect on the natural frequency of the control system.

In a motor control for a printer carriage in accordance with the invention, as described above, the desired results are accomplished for a DC motor with a simple acceleration signal detecting circuit and a circuit for effecting frequency modulation for a reference oscillator with a signal from the acceleration signal detecting circuit. These circuits supplement a conventional phase-locked loop seed control system for a DC motor. The motor control for a printer carriage in accordance with the invention is stable in operation and prevents oscillation or hunting while keeping desired control accuracy. The apparatus includes a mode selection circuit for braking the motor by energizing the motor in the opposite polarity or direction during an interval starting from the changing of the speed of the motor until a phase-difference signal is detected. Thereby, the time required for speed changing is shortened and printing quality when printing with high density dots can be improved and the printing speed can be increased.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A control for the carriage of a serial printer using a DC motor, comprising:
   a driver for driving said DC motor;
   a phase-locked loop speed control circuit including:
      an encoder detecting rotative speed of said DC motor;
      a reference frequency modulatable oscillator outputting reference speed pulses;

a phase comparator for detecting the differences between phases of an output signal from said encoder and an output signal derived from said reference oscillator, said comparator outputting a phase-difference signal, and a switching circuit for switching voltage to be applied to said DC motor in response to an output signal from said phase comparator;

a feedback circuit including:

a low-pass filter converting said phase-difference signal from said phase comparator into an analog speed signal;

a differentiating circuit converting said analog speed signal from said low-pass filter into a quasi-acceleration signal, said quasi-acceleration signal being input to said reference oscillator, said feedback circuit effecting frequency modulation of the output signal from said reference oscillator with said quasi-acceleration signal from said differentiating circuit, said modulation operation bringing said encoder and reference signals in phase;

a mode selection circuit for controlling the flow of current through said DC motor, said mode selection circuit being connected between said phase comparator and said driver, current flow in a first direction providing forward motion for said carriage, current flow in the opposite direction providing one of braking for said forward motion of said carriage and reverse motion of said carriage, said mode selection circuit being adopted to effect braking of said forward motion when said encoder output signal is leading in phase relative to said output signal derived from said reference oscillator, said mode selection circuit causing current flow to produce forward motion of said carriage when said encoder signal lags said output signal derived from said reference oscillator.

2. A control for the carriage of a serial printer as claimed in claim 1, and further comprising a speed setting switching means for inputting a signal to said reference oscillator, said speed setting signal changing the rotation speed of said motor by changing the oscillation frequency of said reference oscillator.

3. A control for the carriage of a serial printer as claimed in claim 1 or 2, wherein said mode selection circuit is adapted to provide motor current for reverse motion of said carriage in response to an externally applied direction signal.

4. A control for the carriage of a serial printer as claimed in claim 2, and further comprising a programmable divider, said output signal derived from said reference oscillator being the result of passing said oscillator signal through said programmable divider.

5. A control for the carriage of a serial printer as claimed in claim 4, wherein said speed setting switching means acts to change the division ratio of said programmable divider.

6. A control for the carriage of a serial printer as claimed in claim 1 or 2, and further comprising a flip-flop circuit, the output of said flip-flop circuit being changed by input of an external speed reduction signal, said changed output of said flip-flop being applied to said mode selection circuit causing said mode selection circuit to operate in said braking mode.

* * * * *